United States Patent [19]

Ohrn

[11] 3,950,941
[45] Apr. 20, 1976

[54] LIFT CHAIN WITH END CONNECTOR

[75] Inventor: Gosta Ohrn, Eskilstuna, Sweden

[73] Assignee: Bulten-Kanthal AB, Sweden

[22] Filed: Nov. 26, 1974

[21] Appl. No.: 527,375

Related U.S. Application Data

[63] Continuation-in-part of Ser. No. 427,583, Dec. 26, 1973, abandoned.

[30] Foreign Application Priority Data

Jan. 12, 1973 Sweden .............................. 7300405
June 6, 1973 Sweden .............................. 7307969

[52] U.S. Cl. .................................. 59/93; 59/86; 24/265 AL; 403/58; 403/157
[51] Int. Cl.² ........................................ F16G 15/02
[58] Field of Search ............ 59/93, 86, 78; 214/730, 214/731, 108, 95, 713; 403/58, 157, 161; 24/265 AL; 105/29 R

[56] References Cited
UNITED STATES PATENTS

| | | | |
|---|---|---|---|
| 1,049,438 | 1/1913 | Augustine | 403/157 |
| 1,273,689 | 7/1918 | Thomas | 59/86 |
| 1,281,986 | 10/1918 | McLaughlin | 59/86 |
| 2,045,869 | 6/1936 | Olsen | 59/78 |
| 2,285,475 | 6/1942 | Valusek | 214/95 R |
| 2,413,829 | 1/1947 | Howison | 59/78 |
| 3,223,267 | 12/1965 | Stammen | 214/730 |
| 3,526,394 | 1/1970 | Howell | 59/86 |

Primary Examiner—C. W. Lanham
Assistant Examiner—Gene P. Crosby
Attorney, Agent, or Firm—Hill, Gross, Simpson, Van Santen, Steadman, Chiara & Simpson

[57] ABSTRACT

A lift chain including an end connector for connecting an end link to the load-carrying member of a fork-lift truck or similar load-handling device. Each link of the chain comprises a plurality of juxtaposed parallel link plates and the end connector includes a clevis joining the end link with a head having a screwthreaded attachment stud. The clevis is pivotally connected to the end link and the head by means of two spaced connector pins disposed crosswise to permit the end link to swing omnidirectionally relative to the head.

6 Claims, 3 Drawing Figures

LIFT CHAIN WITH END CONNECTOR

RELATED APPLICATION

This application is a continuation-in-part of my allowed application Ser. No. 427,583, filed Dec. 26, 1973, which is abandoned with the filing of this application.

BACKGROUND OF THE INVENTION

1. Field of the Invention

This invention relates to a lift chain of the type comprising a string of links, pivotally interconnected by means of transverse parallel link pins and an end connector pivotally connected with an end link of the string of links. More particularly, the invention relates to a lift chain of the type in which each link comprises a plurality of juxtaposed parallel links plates.

2. Prior Art

Fork-lift trucks and similar load-handling equipment often include a lift chain of this type connecting the fork or loadcarrying member with a hydraulic cylinder or other type of hoist motor.

In the past, it has been customary to provide on a head of the end connector a number of spaced parallel flanges interleaved with the link plates, or with pairs or groups of link plates, of the end link of the string of links. The connector pin, which is parallel to the link pins, is passed through registering holes of these flanges and link plates. An end connector of this construction is relatively simple but has to be dimensioned differently for different link plate dimensions and link plate combinations. Accordingly, an assortment of different lift chains requires a large number of different end connector heads. In addition, since the connection between the head and the end link is as rigid laterally (that is, in planes containing the axis of the connector pin) as the string of links, special care is required to avoid lateral bending moments on the lift chain and consequent undue stresses on the link and connector pins and the link plates.

SUMMARY OF THE INVENTION

In accordance with the invention there is provided a lift chain of the kind described in which the end connector includes a clevis having limbs and a bight portion interconnecting the limbs, a first connector pin parallel to the link pins and pivotally connecting a first portion of the clevis to an end link of the string of links, and a second connector pin extending through the head perpendicularly to the link pins and the first connector pin and pivotally engaging another portion of the clevis.

The above and other features and objects and advantages of the invention will be understood from the following description of exemplary embodiments with reference to the accompanying drawing, in which:

Figure 1:
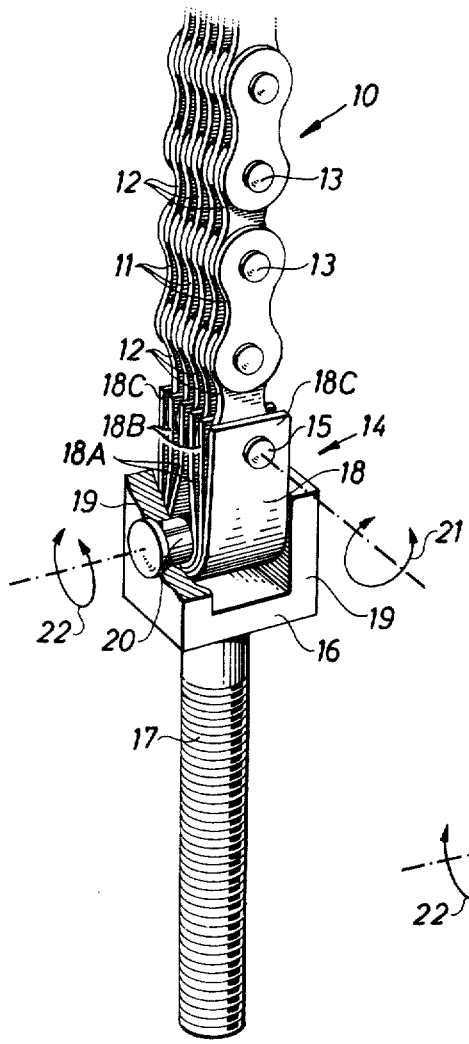
FIG. 1 is a perspective view of one end of a lift chain embodying the invention.

AS SHOWN ON THE DRAWINGS:

The lift chain illustrated in the drawing is intended for use in a fork-lift truck and includes a string 10 of links and an end connector generally designated 14 which is connected to an end link of the string. The string 10 is a so-called Fleyer chain, and accordingly each link comprises a plurality of identical juxtaposed link plates distributed over the entire width of the chain and pivotally connected with the link plates of adjacent links by means of transverse link pins. Alternate links of the string 10, the so-called outer links, each comprises six identical link plates 11 and the intervening links, the so-called inner links, each comprises five identical link plates 12. The outer link plates 11 are separated by the inner link plates 12 and the adjacent interleaved end portions of the inner and outer link plates are pivotally interconnected and held together by the cylindrical link pins 13 which extend through and closely fit with registering cylindrical holes in the link plates.

The end link of the string 10, which is an inner link, is pivotally connected to the end connector 14 by means of a connector pin 15 which is parallel to the link pins 13 and may be identical to these pins. The end connector 14 comprises a U-shaped or bifurcated head 16 generally resembling the heads of conventional end connectors and integral with or secured to a screw-threaded attachment stud 17, and a clevis 18 having one end, the bight end, received between the parallel flanges 19 of the head 16 and pivotally connected to the head by means of a connector pin 20 extending through the flanges 19 perpendicularly to the connector pin 15 and the link pins 13. The other end of the clevis 18 is pivotally connected to the outer end of the end link of the string 10 by means of the connector pin 15 and accordingly the string 10 can swing in two perpendicular planes relative to the end connector 14, namely, about the connector pin 15 (double arrow 21) and about the connector pin 20 (double arrow 22).

The clevis 18 comprises three nested clevis members 18A, 18B, 18C made from rectangular sheet metal strips bent over to U or clevis shape. Thus, each clevis member comprises two similar limbs and an interconnecting arcuately curved bight portion. The outer ends of the limbs have registering cylindrical holes receiving the connector pin 15 with a close fit.

As shown in FIG. 1, the clevis 18 encloses the connector pin 20, the bight portions of the three clevis members immovably engaging each other and pivotally engaging the connector pin. The limbs of the clevis members are of the same thickness as the outer link plates 11 and are spaced by a distance equal to the thickness of the inner link plates 12 so that adjacent limbs can receive between them the outer end portions of the end link plates 12 in the same manner as the link plates 11 of the adjacent outer link receive between them the inner end portions. Thus, the limbs of the clevis members correspond to the outer link plates 11 in respect of their number, thickness and disposition.

Figure 2:
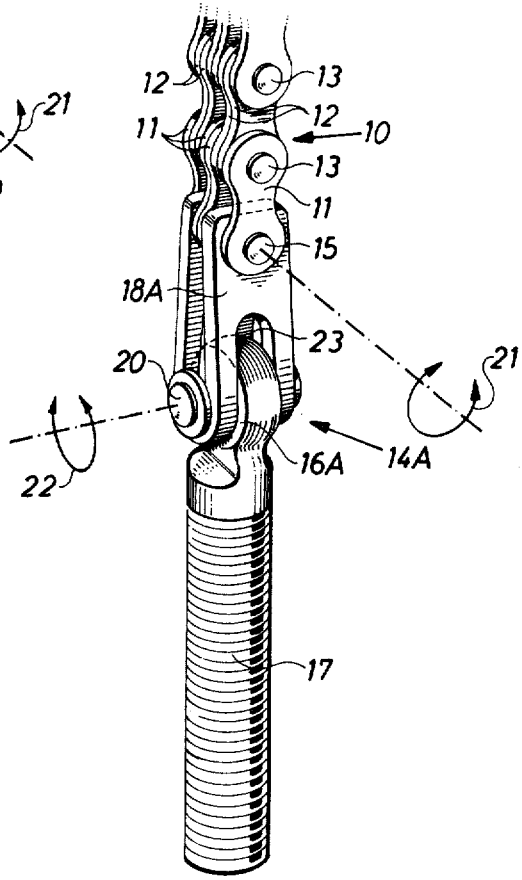
FIG. 2 is a similar view showing a modified embodiment.

The modified embodiment illustrated in FIG. 2 is particularly advantageous in that the head 16A of the end connector 14A can be formed integral with the attachment stud 17 using a relatively simple and inexpensive forging tool. The string 10 of links shown in FIG. 2 is also a Fleyer chain in which each link comprises four identical link plates. The outer links thus each comprises two center link plates 11 in face-to-face engagement and two side link plates 11 on either side of the center link plates. The link plates 12 of the inner links are arranged in pairs separating the side link plates of the outer links from the center link plates.

The clevis 18A is made from a single sheet metal strip bent over to U or clevis shape. A slot 23 is formed through the bight portion and the adjacent portions of the limbs in a center plane containing the axis of the connector pin 15. This slot receives with a relatively close fit a flat and generally circular flange constituting the major portion of the head 16A.

The limbs of the clevis 18A are of the same thickness as the pairs of inner link plates 12 and are spaced apart by a distance equal to the combined thickness of the center link plates 11 of the end link. Thus, the limbs of the clevis 18A correspond to the pairs or groups of inner link plates 12 in respect of their number, thickness and disposition.

As will be appreciated, one and the same connector head 16 or 16A with the attachment stud 17 can be used with several different combinations and dimensions of the link plates. It is true that different clevises 18 or 18A are required but since these components are relatively simple and inexpensive, this provides no major inconvenience.

Figure 3:
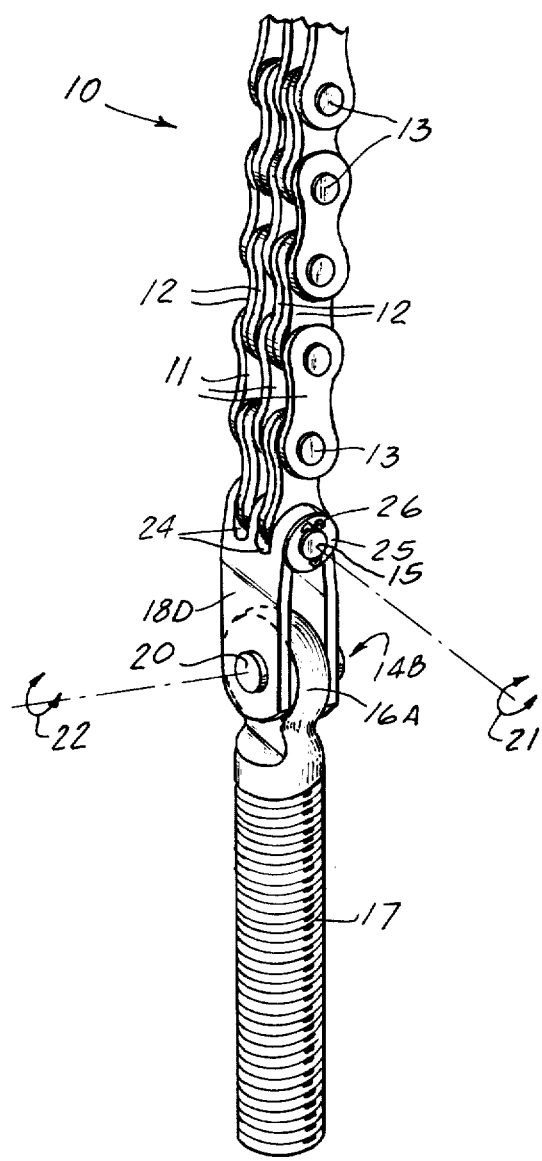
FIG. 3 is a similar view showing a further embodiment.

A further modified embodiment is illustrated in FIG. 3 and is generally similar to that of FIG. 2 except that it has a clevis 18D which has been turned 90° and also end for end.

To this end, the string of links 10 includes a number of outer links made of link plates 11 and separated by and connected to a number of inner links made up of inner link plates 12, each link being connected to the adjacent link by a connector pin 13. The end connection 14B includes the clevis 18D connected by the connector pin 15 to the end link of the string 10 and by the connector pin 20 to the head 16A of the end connection 14B, the head 16A being integral with the attachment stud 17 as described before.

The bight end of the clevis 18D has a pair of slots 24, 24 each sized to snugly receive two of the link plates 12. The connector pin 15 here includes, at least at one end, a washer 25 and cotter pin 26 which facilitates disconnection and reconnection between the string 10 and the end connection 14B. The connector pin 15 thus fits snugly in and is guided by the bight end of the clevis 18D, while the arms thereof form a further slot at right angles to the slots 24 receptive of the head 16A.

Although various minor modifications may be suggested by those skilled in the art, it should be understood that I wish to embody within the scope of the patent warranted hereon, all such embodiments as reasonably come within the scope of my contribution to the art.

I claim as my invention:

1. A lift chain comprising:
   a. a string of links, each link comprising a plurality of juxtaposed parallel link plates, adjacent link plates of alternate links being separated by individual link plates of the adjacent links;
   b. transverse parallel link pins extending through and pivotally interconnecting adjacent links;
   c. an end connector including a head;
   d. a clevis having limbs and a bight portion interconnecting the limbs;
   e. a first connector pin parallel to the link pins and pivotally connecting a first portion of the clevis to an end link of the string of links;
   f. a second connector pin extending through the head perpendicularly to the link pins and the first connector pin and pivotally engaging another portion of the clevis; and
   g. said clevis comprising a plurality of nested clevis members formed from bent-over sheet metal strips, the number of clevis members being dependent on the number of link plates of the end link, the bight portions of adjacent clevis members engaging each other and the ends of adjacent limbs of the clevis members straddling a portion of a link plate of the end link.

2. A lift chain comprising:
   a. a string of links, each comprising a plurality of juxtaposed parallel link plates;
   b. transverse parallel link pins extending through and pivotally interconnecting adjacent links;
   c. an end connector including a head;
   d. a clevis having limbs and a bight portion interconnecting the limbs;
   e. a first connector pin parallel to the link pins and pivotally connecting a first portion of the clevis to an end link of the string of links;
   f. a second connector pin extending through the head perpendicularly to the link pins and the first connector pin and pivotally engaging another portion of the clevis;
   g. one of said portions of the clevis having a slot in a plane parallel to the axis of said first connector pin; and
   h. said head of said end connector including a single flange received in said slot and being integral with an attachment member.

3. A lift chain according to claim 2 in which groups of directly adjacent link plates of alternate links are separated by link plates of the adjacent links, and the clevis member is a U-shaped sheet metal strip.

4. A lift chain according to claim 3 in which the ends of the limbs of the clevis straddle a portion of a directly adjacent link plate group of the link.

5. A lift chain comprising:
   a. a string of links, each comprising a plurality of juxtaposed parallel link plates;
   b. transverse parallel link pins extending through and pivotally interconnecting adjacent links;
   c. an end connector including a head;
   d. a clevis having limbs and a bight portion interconnecting the limbs, said clevis having a plurality of slots in said bight portion;
   e. a first connector pin parallel to the link pins and pivotally connecting a first portion of the clevis to an end link of the string of links, said end link having spaced link plates disposed in said slots; and
   f. a second connector pin extending through the head perpendicularly to the link pins and the first connector pin and pivotally engaging another portion of the clevis.

6. A lift chain according to claim 5 in which a plurality of link plates is received in each of said slots in said clevis.

* * * * *